United States Patent
Defrang et al.

(10) Patent No.: US 7,924,844 B1
(45) Date of Patent: Apr. 12, 2011

(54) SYSTEM AND METHOD FOR COMMUNICATING MESSAGES AMONG COMPONENTS IN A COMPUTING ENVIRONMENT

(75) Inventors: Bruce A. Defrang, Batavia, IL (US); Patrick R. Lee, Bolingbrook, IL (US)

(73) Assignee: Computer Associates Think, Inc., Islandia, NY (US)

( * ) Notice: Subject to any disclaimer, the term of this patent is extended or adjusted under 35 U.S.C. 154(b) by 882 days.

(21) Appl. No.: 11/040,147

(22) Filed: Jan. 21, 2005

Related U.S. Application Data (60) Provisional application No. 60/538,364, filed on Jan. 21, 2004.

(51) Int. Cl.
*H04L 12/56* (2006.01)
(52) U.S. Cl. .................................................. 370/394
(58) Field of Classification Search .............. 370/299, 370/412, 389, 394, 395.71, 417, 471; 714/18, 714/48, 748; 719/314
See application file for complete search history.

(56) References Cited

U.S. PATENT DOCUMENTS

| | | | |
|---|---|---|---|
| 5,377,188 A * | 12/1994 | Seki | 370/390 |
| 5,694,598 A | 12/1997 | Durand et al. | |
| 5,878,056 A * | 3/1999 | Black et al. | 714/748 |
| 6,009,428 A | 12/1999 | Kleewein et al. | |
| 6,202,099 B1 | 3/2001 | Gillies et al. | |
| 6,477,580 B1 | 11/2002 | Bowman-Amuah | |
| 6,529,932 B1 * | 3/2003 | Dadiomov et al. | 718/101 |
| 6,606,660 B1 | 8/2003 | Bowman-Amuah | |
| 6,615,253 B1 | 9/2003 | Bowman-Amuah | |
| 2004/0139153 A1 | 7/2004 | Heidenreich | |
| 2004/0143660 A1 | 7/2004 | Dimitroff et al. | |
| 2004/0167862 A1 | 8/2004 | Yabloko | |

* cited by examiner

*Primary Examiner* — Chirag G Shah
*Assistant Examiner* — Yong Zhou
(74) *Attorney, Agent, or Firm* — Pillsbury Winthrop Shaw Pittman LLP (57) ABSTRACT

In one embodiment, a method for communicating messages in a computing environment includes receiving a message from a client, storing the message in a persistent memory, sending the message to an intended destination until the message is received by the intended destination, and deleting the message from the persistent memory after the message is received by the intended destination.

25 Claims, 2 Drawing Sheets

SYSTEM AND METHOD FOR COMMUNICATING MESSAGES AMONG COMPONENTS IN A COMPUTING ENVIRONMENT

RELATED APPLICATION

This application claims the benefit of U.S. Provisional Application No. 60/538,364 filed Jan. 21, 2004.

TECHNICAL FIELD

This disclosure relates generally to the field of data communications and more specifically to a system and method for data communications in computer systems.

BACKGROUND

Data communication in a computing environment generally involves the communication of messages from a source to a destination. The source may be a component such as an application on a source computer that initiates sending of a message to a destination component, which may be another component on the same source computer system or may be a component on a different destination computer system. As an example, a management application running on a source computer system may need to distribute rules to a number of agent applications distributed across many destination computer systems via a network or otherwise. Current systems for data communication generally involve direct calls between components and/or computer systems.

SUMMARY

This disclosure provides a system and method for communicating messages among components in a computing environment.

In one embodiment, a method for communicating messages in a computing environment includes receiving a message from a client, storing the message in a persistent memory, sending the message to an intended destination until the message is received by the intended destination, and deleting the message from the persistent memory after the message is received by the intended destination.

In another embodiment, a method for communicating messages in a computing environment includes receiving a message from a client in a computer system, the message having an intended destination. The method further includes storing the message such that if other messages having the intended destination have not been successfully sent to the intended destination, an order in which the messages were received is substantially preserved. The method further includes if the message is the first message in the order, attempting to send the message to the intended destination and determining whether the message was successfully sent to the intended destination. The method further includes, if the message was not successfully sent to the intended destination, at an interval, attempting to resend the message to the intended destination in the order that the message received relative to other messages having the intended destination.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION

Figure 1:
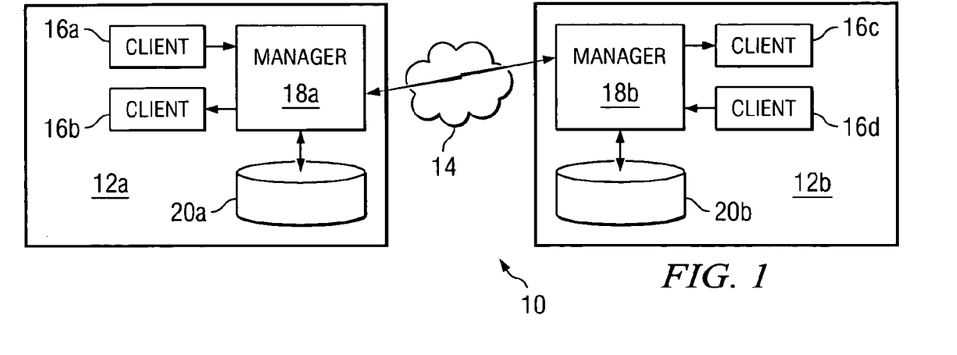
FIG. 1 illustrates an example system for communicating messages among clients in a computing environment.

FIG. 1 illustrates an example system 10 for communicating messages among clients in a computing environment. In one embodiment, system 10 includes a computer system 12a and a computer system 12b. Throughout the present disclosure, reference to computer system 12 or computer systems 12 is meant to refer generally to a computer system 12. In general, system 10 may provide an improved degree of certainty that messages sent by a source client on computer system 12a to an intended destination such as another client on computer system 12a or to a client on computer system 12b will be delivered. Furthermore, in certain embodiments, system 10 may provide an improved degree of certainty that the messages will be delivered in the order they were communicated by the source client. In one embodiment, a message includes a unit of data sent between two computer systems or between two clients running on the same computer. Although the terms "source" and "destination" are used throughout this disclosure to described various components of system 10, certain components may serve as both a source and destination for purposes of sending and receiving messages according to the present disclosure. Furthermore, although the present disclosure describes only computer system 12a and computer system 12b, the present disclosure contemplates system 10 including any suitable number of computer systems 12 sending and receiving messages among each other.

Computer system 12a and computer system 12b may be coupled to one another using a link 14 that includes one or more computer buses, one or more local area networks (LANs), one or more metropolitan area networks (MANs), one or more wide area networks (WANs), at least a portion of a global computer network such as the Internet, or one or more other suitable wireline, optical, wireless, or other links. Links 14 may communicate, for example, Internet Protocol (IP) packets, Frame Relay frames, Asynchronous Transfer Mode (ATM) cells, voice, video, data, and other suitable information between network addresses.

Computer systems 12 and associated components may each operate on one or more computers at one or more locations. In one embodiment, each computer system 12 includes a single computer such as a laptop or desktop computer. In another embodiment, each computer system 12 includes multiple computers coupled to one another in a client/server environment, for example. Although computer systems 12 are described primarily as being separate and/or remote, computer systems 12 may share one or more computer resources or other appropriate resources according to particular needs. Furthermore, each computer system 12 may be running on any suitable platform and include any suitable software, hardware, or firmware independent of the platform, software, hardware, or firmware of other computer systems 12. Where appropriate, reference to computer system 12 is meant to include one or more associated human users.

Each computer system 12 may include one or more clients 16. Clients 16 may include software applications, services, daemons, or any other suitable components capable of either generating messages, receiving messages, or both. For example, a source client 16 on a computer system 12 (e.g., client 16a on computer system 12a) may generate and send a message intended for another client 16 on the same computer system 12 (e.g., client 16b on computer system 12a), another client 16 on another computer system 12 (e.g., client 16d on computer system 12b), or intended for multiple clients 16 on multiple computer systems 12. In one embodiment, a message includes any suitable unit of data that may be sent between computer systems 12 and/or clients 16. For example, a message may include a text string or any other suitable unit of data. A message may include a destination identifier identifying the intended destination of the message. The intended destination for a message sent by a client 16 on a computer system 12 may include one or more of another client 16 on the same computer system 12 (e.g., client 16b on computer system 12a), another client 16 on another computer system 12 (e.g., client 16d on computer system 12b), multiple clients 16 on multiple computer systems 12, and any other suitable destination, according to particular needs. A message may be intended for any suitable number of destinations, according to particular needs. In one embodiment, communication within system 10 is asynchronous in that messages are sent and received in separate processes.

Each computer system 12 may include a manager component 18. In general, manager component 18 may receive messages from and deliver messages to clients 16 (e.g., manager component 18a on computer system 12a may receive messages from and deliver messages to clients 16a and 16b) and receive messages from and deliver messages to other manager components 18 associated with another computer system 12 (e.g., manager component 18a on computer system 12a may receive messages from and deliver messages to manager component 18b on computer system 12b). In one embodiment, a manager component 18 on one computer system 12 (e.g., manager component 18a on computer system 12a) may send and receive messages directly to and from clients 16 on another computer system 12 (e.g., clients 16c and 16d on computer system 12b). For purposes of this disclosure, the intended destination of a message may include a client 16 on the same computer system 12 as the sender of the message, a client 16 on a different computer system 12, a manager component 18, or any other suitable destination. For example, the intended destination of a message from a client 16 may be a client 16 on the same computer system 12 or a different computer system 12 as the client 16 that sent the message. As another example, the intended destination of a message from a manager component 18 may be another manager component 18 or a different computer system 12, a client 16 on the same or a different computer system 12, or any other suitable destination.

In one embodiment, manager component 18 may provide clients 16 on computer systems 12 with guaranteed message delivery (absent expiration of the message, as described below) in the order that the messages are sent by clients 16. The capabilities provided by manager component 18 may improve communication between clients 16, whether the clients 16 are running on the same or different computer systems 12.

Manager component 18 may be written as a middleware component of computer system 12. For example, manager component 18 may be a message oriented middleware (MOM) layer of system 10, which may connect different components of system 10 across multiple threads, processes, machines, computer systems 12, operating system platforms, or other suitable components to provide, for example, program-to-program exchange. Manager component 18 may include an application program interface (API) that is accessible to and usable by clients 16 on computer systems 12. Furthermore, although illustrated as being on computer system 12, the present disclosure contemplates manager component 18 being separate from but accessible to computer system 12.

In one embodiment, manager component 18 is coupled to a memory 20, which may be local or remote to the computer system 12 associated with manager component 18. Memory 20 may include any suitable any fixed or removable storage media such as a local hard disk, a magnetic computer disk, CD-ROM, mass storage media, or other suitable media for storage of data. In one embodiment, memory 20 includes or is coupled to a database or other suitable information server. Although only one memory 20 is shown, each computer system 12 may include or be coupled to any suitable number and types of memories 20, according to particular needs. Memory 20 may store and facilitate retrieval of messages stored by manager component 18. In one embodiment, memory 20 is persistent memory. Memory 20 may include any hardware, software, firmware, or combination thereof operable to store and facilitate retrieval of information. Additionally, memory 20 may use any of a variety of data structures, arrangements, and compilations to store and facilitate retrieval of information.

Each time client 16 sends a message, the message may be sent to the manager component 18 of the computer system 12 on which the client 16 is operating. In one embodiment, client 16 may call a send function when sending a message. The send function may be a part of the API of manager component 18, for example. A message sent by client 16 may be saved in memory 20 of the computer system 12 on which the client 16 is operating. In one embodiment, the message may be saved in memory 20 regardless of whether manager component 18 is communicating. For example, the send function called by client 16 when sending a message may determine whether the manager component 18 is communicating. If the manager component 18 is communicating, the send function may forward the message to the manager component 18, which may save the message in memory 20 at this or a later time. If the send function determines that manager component 18 is not communicating, the send function may store the message in a designated location such as memory 20. Saving the message to memory 20, either by the send function or by manager component 18, may prevent the message from being lost in the event of failure of computer system 12, due to a crash of the operating system or a power failure for example.

Manager component 18 may receive the message from a client 16 on the same computer system 12 as the manager component 18 (e.g., manager component 18a may receive a message from client 16a or 16b), from another manager component 18 operating on a different computer system 12 (e.g., manager component 18a on computer system 12a may receive a message from manager component 18b on computer system 12b), or from any other suitable source. In one embodiment, manager component 18, substantially immediately upon receipt of the message, stores the message in memory 20. Once manager component 18 stores the message, manager component 18 may notify client 16 or another manager component 18 that sent the message that the message has been received and stored, and the receiving manager component 18 may assume responsibility for the message. In one embodiment, a client 16 or other manager component 18 may resend a message until it receives notification from the receiving client 16 or manager component 18 that the message has been received and stored.

Manager component 18 may determine the intended destination of a message it receives. For example, in an embodiment in which messages include a destination identifier, manager component 18 may use the destination identifier of the message to determine the intended destination of the message. In one embodiment, manager component 18 may save the message to a message delivery queue in memory 20. The message delivery queue in memory 20 may be a first-in/first-out (FIFO) queue, a last-in/first-out (LIFO) queue, or any other suitable type of queue according to particular needs. Although queues are described, the present disclosure contemplates storing messages in any suitable manner such that the order in which the messages were received is substantially preserved (e.g., using any suitable data structure).

Messages may be stored in the message delivery queue according to the time the messages were generated by a client 16, the time the messages were received by manager component 18, or according to any other suitable criterion. For example, in certain embodiments, messages from particular clients 16 or of a particular type may be assumed to be of a high priority and may automatically be advanced to the "front" of the message delivery queue regardless of the number of messages in the message deliver queue or any time stamp information. In one embodiment, storing messages in a message delivery queue may help guarantee that messages are delivered in a particular order. Thus, substantially preserving the order of messages may include substantially preserving any suitable order (e.g., time generated, time received, priority, etc.) according to particular needs. Manager component 18 may maintain multiple message delivery queues. For example, manager component 18 may maintain a message delivery queue for each destination (e.g., a client 16 on the same computer system 12 as manager component 18, a client 16 on a different computer system 12, or a manager component 18 on a different computer system 12) to which one or more messages are waiting to be delivered. In one embodiment, manager component 18 may determine, based on the intended destination of the message, whether other messages are waiting in a message delivery queue for the same intended destination.

Messages may be waiting to be delivered because the intended destination (or a manager component 18 associated with the intended destination) is not operating or is otherwise unavailable, for example. If there are messages waiting in a message delivery queue for the intended destination of the message, then manager component 18 may store the message in the message delivery queue for the destination. In one embodiment, manager component 18 may not attempt to deliver the message to the intended destination if there are already messages in a message delivery queue for the intended destination. A message delivery queue for a particular intended destination may include messages that originated from different clients 16 or manager components 18.

Manager component 18 may be further operable to initiate sending of the message to the intended destination or to another manager component 18 associated with the intended destination. In one embodiment, if there are no messages in the message delivery queue for the intended destination of the message when manager component 18 receives the message, manager component 18 may attempt to deliver the message to the intended destination. For example, if the intended destination is a client 16 on the same computer system 12 as manager component 18, manager component 18 may attempt to send the message to client 16. As another example, if the intended destination is remote from the computer system 12 on which the manager component 18 is running, manager component 18 may attempt to send the message to a manager component 18 on the computer system 12 of the intended destination. In this example, a manager component 18 on one computer system 12 (e.g., manager component 18*a* on computer system 12*a*) may determine the manager component 18 on the computer system 12 of the remote intended destination (e.g., manager component 18*b* on computer system 12*b* of client 16*d*) by consulting a look-up table or other suitable reference that maps clients 16 to associated manager components 18. In one embodiment, a remote client 16 that is an intended destination may not be associated with a manager component 18. In that case, the manager component 18 associated with the client 16 that originated the message may attempt to deliver the message directly to the remote client 16.

Manager component 18 may be further operable to determine whether the message was successfully sent to the intended destination or to the manager component 18 on the computer system 12 of the intended destination. Delivery of message may fail because the intended destination client 16 is not currently communicating, the network for communicating the message to another manager component 18 is not functioning properly, the manager component 18 on the computer system of the intended destination is not currently communicating, or for any other suitable reason. If manager component 18 determines that the attempt to send the message was unsuccessful, then manager component 18 may retry sending the message until it is successful. For example, if manager component 18 is maintaining a message delivery queue for the intended destination, manager component 18 may attempt to resend the first message in the message delivery queue for the intended destination at an interval. For example, manager component 18 may attempt to resend the first message in the message delivery queue once every minute or at any other suitable interval. In one embodiment, if manager component 18 is unable to send the messages in the message delivery queue to the intended destination (or manager component 18 associated with the intended destination), manager component 18 may wait for a signal from the intended destination (or the manager component 18 on the computer system 12 of the intended destination) indicating that the intended destination (or manager component 18 on the computer system 12 of the intended destination) is ready to receive messages. For example, the intended destination may call an initialization function that notifies the manager component 18 that the intended destination is operating and awaiting any messages that are intended for the intended destination.

In one embodiment, a message may be allowed to expire after a predetermined time. For example, if a message has not been successfully sent to its intended destination or manager component 18 associated with its intended destination before the predetermined time elapses, then the message may be erased from memory 20 and taken out of the message delivery queue for the intended destination of the message. The predetermined time may be fixed for all messages, specified for each message, or determined in any other suitable manner, according to particular needs. In one embodiment, the predetermined time is one day. In an embodiment in which messages are allowed to expire, manager component 18 may determine whether a message has expired before attempting to resend the message to its intended destination or manager component 18 associated with its intended destination. Thus, manager component 18 may attempt to resend the message at an interval until the message is either successfully delivered or the message expires. In one embodiment, if the message is stored in a message delivery queue with preceding messages in the message delivery queue intended for the same destination or manager component 18, the message may only be retried after any messages preceding the message are either successfully sent or expire, or not retried at all if the message expires before the preceding messages in the message delivery queue are successfully sent or expire.

If manager component 18 determines that the message was successfully communicated to the intended destination of the message or to the manager component 18 associated with the intended destination, manager component 18 may delete the message from memory 20 and from the message delivery queue for the intended destination, if appropriate. In one embodiment, manager component 18 may receive a confirmation message from the intended destination or another manager component 18 associated with the intended destination notifying the sending manager component 18 that the message was successfully sent. If the intended destination is a client 16 on the same computer system 12 as manager component 18, message delivery may be complete at this point. If the intended destination is a client 16 on a computer system 12 other than the computer system on which the manager component 18 that delivered the message resides, then the manager component 18 on the different computer system 12 may assume responsibility for the message and may process the received message in a substantially similar manner to that described above. In one embodiment, whether messages are received by a manager component 18 or a client 16, they may be received asynchronously.

In one embodiment, manager component 18 includes or provides at least the following functions: Init( ); Send( ); Receive( ) and ReceiveComplete( ). These functions are provided merely as examples, and the present disclosure is not intended to be limited to these functions. Furthermore, the names of the functions are provided merely as examples. The Init( ) function may be used by a client 16 or by a manager component 18 that want to begin receiving messages. For example, the client 16 or manager component 18 may call the Init( ) function to initialize a new receive queue. The Init( ) function may provide the functionality described above with reference to the initialization function. The Send( ) function may be used by a client 16 or manager component 18 that wants to send a message. The Send( ) function may provide the functionality described above with reference to the send function. The Receive( ) function may be used by a client 16 or manager component 18 to receive one or more messages. In one embodiment, if a client 16 calls the Receive( ) function and if the manager component 18 does not have any messages to be delivered to the client 16 (e.g., in a message delivery queue for the client 16), then the Receive( ) function may wait until the manager component 18 has a message for the client 16. In one embodiment, the Receive( ) function does not time out. The ReceiveComplete( ) function may be called by a client 16 or manager component 18 to inform the sender of a message that the message has been received successfully. At this point, the sender of the message may relinquish responsibility for the message and need not follow up.

In certain embodiments, processing messages according to the present disclosure may substantially guarantee message delivery in the order that messages are sent. In certain embodiments, messages may eventually be delivered to the intended destination even if the intended destination is offline at the time the message is initially sent to the intended destination. When a message must wait to be delivered, additional processing by a client 16 that sends a message, for example, may be able to continue as if the message was already sent to the intended destination. In certain embodiments, because messages are stored in a message delivery queue or otherwise, the present disclosure may reduce or eliminate the effect of component failures on messages. In certain embodiments, the present disclosure may provide cross-platform independence such that client 12a and client 12b may be operating on different platforms, for example. Certain capabilities provided by the certain embodiments of the present disclosure may be referred to as store-and-forward capabilities.

Figure 2:
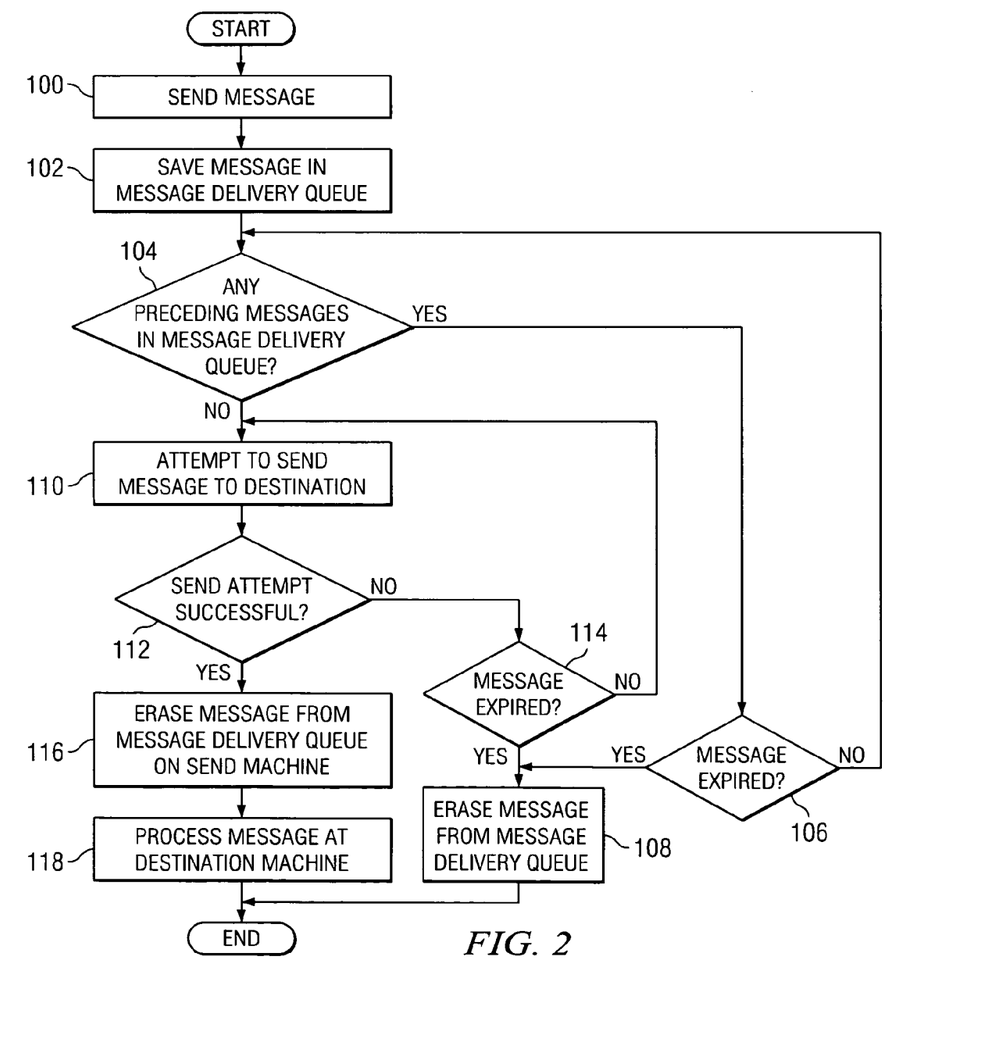
FIG. 2 illustrates an example method for communicating messages among clients in a computing environment in which the source client that sends the message is on a different computer system than the intended destination client.

FIG. 2 illustrates an example method for communicating messages among clients 16 in a computing environment in which the source client 16 that sends the message is on a different computer system 12 than the intended destination client 16. The example method illustrated in FIG. 2 and the accompanying description below follow a single message sent by a source client 16a on computer system 12a and having an intended destination client 16d on computer system 12b. It should be understood, however, that this is for example purposes only. Furthermore, message delivery according to the present disclosure may be an ongoing process handling any suitable number of messages originating from or destined for clients 16 on multiple computer systems 12.

At step 100, source client 16a sends a message identifying a destination client 16d. Source client 16a may include a software application, service, daemon, or any other suitable component of computer system 12a. Source client 16a may send the message to manager component 18a of computer system 12a. For example, source client 16a may call a send function, which may be a part of the API of manager component 18. In general, destination client 16 may be a client 16 on the same computer system 12 as the source client 16a (e.g., client 16b); however, in the method described with reference to FIG. 2, destination client 16d is on a remote computer system 12b. At step 102, manager component 18a may save the message in memory 20. In one embodiment, manager component 18a saves the message to a message delivery queue in memory 20. In certain embodiments, manager component 18a maintains multiple message delivery queues, such as one for each destination for which messages are awaiting delivery, for example. Manager component 18a may search for an appropriate message delivery queue in which to save the message based on the intended destination of the message, for example. If no message delivery queue exists for messages bound for the intended destination of the current message, manager component 18a may initiate creation of a message delivery queue for messages bound for the intended destination of the current message. In one embodiment, if manager component 18a is not operating or is otherwise unavailable, the send function called by source client 16a may save the message to memory 20. In this case, manager component 18 may check memory 20 for messages when manager component 18a becomes available. Manager component 18a may then assume responsibility for messages in memory 20, possibly notifying client 16a.

At step 104, manager component 18a may determine whether there are any preceding messages in the message delivery queue to which the message was saved (e.g., the message delivery queue for the intended destination). For example, the message delivery queue may include messages, which manager component 18a previously but unsuccessfully attempted to send to the destination associated with the message delivery queue. These messages may be stored in the message delivery queue to be resent in the future at any suitable interval, for example. In one embodiment, if there are preceding messages in the message delivery queue to which the message was saved (e.g., the message delivery queue for the intended destination), manager component 18a does not attempt to send the current message to the intended destination, presuming that because there are messages in the message delivery queue associated with that intended destination, that the intended destination or manager component 18 associated with the intended destination is still offline or otherwise unavailable. In this embodiment, manager component 18a may attempt to send the current message when other messages in the message delivery queue for the intended destination have been sent or have expired. In another embodiment, manager component 18a initiates an attempt to send the current message even though there are messages in the message delivery queue.

If manager component 18a determines at step 104 that there are one or more preceding messages in the message delivery queue, manager component 18a determines at step 106 whether the current message has expired. In one embodiment, a predetermined time is used to determine whether the message is expired, and manager component 18a determines whether the message has been in the message delivery queue for the predetermined time. The predetermined time for expiration may be one day or any other suitable time, according to particular needs. If manager component 18a determines at step 106 that the message has expired (e.g., that the message has been in the message delivery queue for the predetermined time), the message may be erased from memory 20 and the message delivery queue at step 108. If manager component 18a determines at step 106 that the messages has not expired, then manager component 18a may return to step 104 to determine whether there are any preceding messages in the message delivery queue. In one embodiment, decision steps 104 and 106 may cycle continuously or at any other suitable interval until either the message expires or there are no preceding messages in the message delivery queue. Queuing up messages for an intended destination in this manner and waiting until preceding messages are sent before sending the current message, the present disclosure may facilitate sending of messages to the intended destination in the order in which they were originally sent by their source client 16 or in any other suitable order according to particular needs.

Returning to step 104, if manager component 18a determines that there are no preceding messages in the message delivery queue, manager component 18a may attempt to send the message to the intended destination at step 110. For example, in an embodiment in which source client 16a and destination client 16d are on different computer systems 12a and 12b, respectively, manager component 18a on computer system 12a may attempt to contact manager component 18b on computer system 12b. In another embodiment, manager component 18b on computer system 12b may notify manager component 18a on computer system 12a when manager component 18b is ready to begin receiving messages, which may prompt manager component 18a to attempt to send messages from a message delivery queue for clients 16 on computer system 12b.

At step 112, manager component 18a determines whether the message was successfully sent to manager component 18b. For example, manager component 18b may receive the message from manager component 18a, store the message in memory 20b, and send a confirmation to manager component 18a indicating that the message was successfully received. In one embodiment, if manager component 18a does not receive this confirmation message within a predetermined time, manager component 18a determines that the message was not successfully sent. If it is determined at step 112 that the message was not successfully sent to manager component 18b, then manager component 18a determines at step 114 whether the message has expired. If the message has expired at step 114, then manager component 18a may erase the message from memory 20 and the message delivery queue at step 108. If the message has not expired at step 114, then manager component 18a may return to step 110 to attempt to send the message to manager component 18b again. In one embodiment, manager component 18a may cycle through steps 110, 112, and 114 continuously or at any other suitable interval until either the message expires or until the message is successfully sent to manager component 18b.

Returning to step 112, if manager component 18a determines that the message was successfully sent to manager component 18b (e.g., by receiving a notification from manager component 18b), then manager component 18a may erase the message from memory 20 and the message delivery queue at step 116. As described above, this may be in response to a confirmation from manager component 18b that manager component 18b received the message, which may allow manager component 18a to assume manager component 18b saved the message and is assuming responsibility for message delivery. In one embodiment, manager component 18b on computer system 12b saves the message to a message delivery queue for delivery to client 16d (the intended destination of the message originally generated by client 16a) on computer system 12b. At step 118, manager component 18b on computer system 12b may process the message. For example, manager component 18b may process the message according to the example method described below with reference to FIG. 3 for delivering messages to a local client 16.

Figure 3:
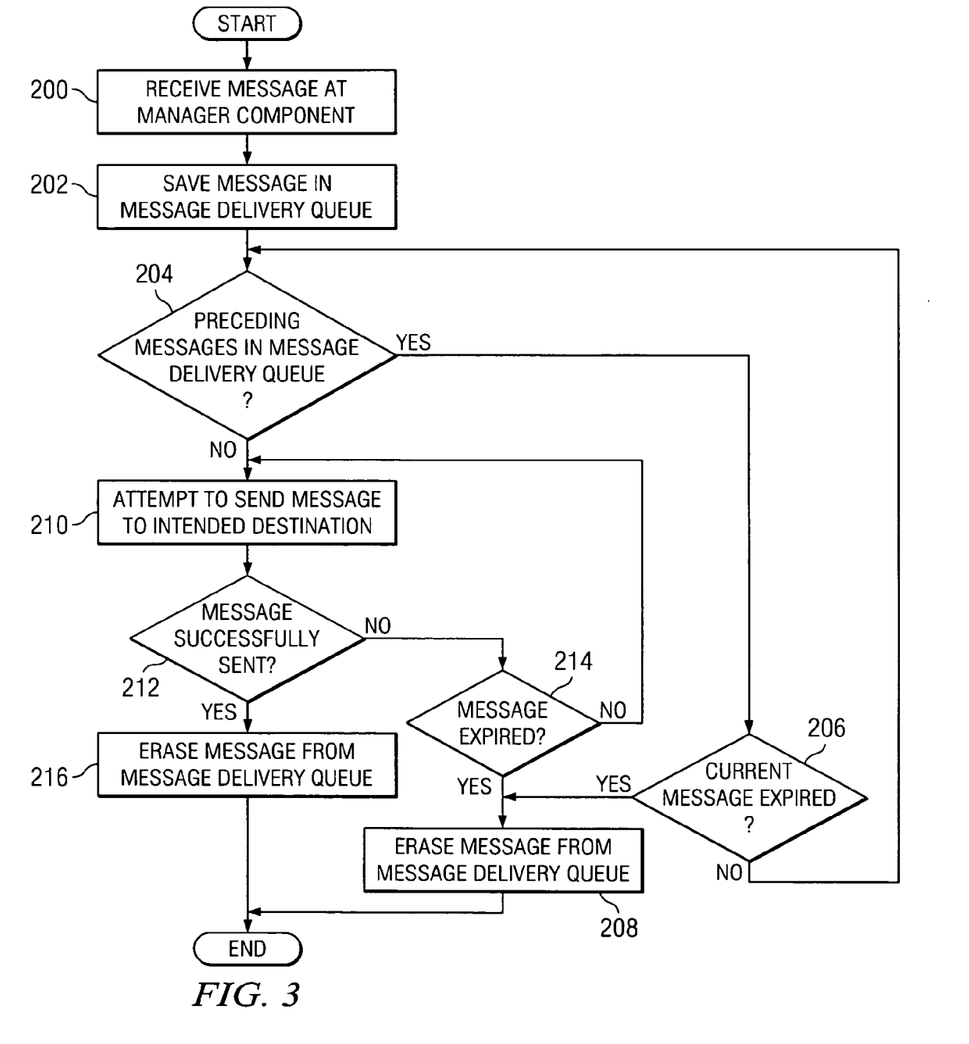
FIG. 3 illustrates an example method for delivering a message to a client associated with the same computer system as the manager component that receives the message.

FIG. 3 illustrates an example method for delivering a message to a client 16 associated with the same computer system 12 as the manager component 18 that receives the message. The example method illustrated in FIG. 3 and the accompanying description below follow a single message received at manager component 18b on computer system 12b and having an intended destination client 16d on computer system 12b. It should be understood, however, that this is for example purposes only. Furthermore, message delivery according to the present disclosure may be an ongoing process handling any suitable number of messages originating from or destined for clients 16 on multiple computer systems 12.

At step 200, manager component 18b on a computer system 12b may receive a message. The message may be received from a client 16c associated with the same computer system 12b, from another manager component 18a associated with another computer system 12a, or from any other suitable source. In one embodiment, manager component 18b previously called a receive function to indicate to clients 16 and other manager components 18 (e.g., manager component 18a) that manager component 18b is ready to receive messages. At step 202, manager component 18b may save the message in memory 20. In one embodiment, manager component 18b may save the message to a message delivery queue in memory 20. In certain embodiments, manager component 18b may maintain multiple message delivery queues, such as one for each intended destination for which messages are awaiting delivery, for example. Manager component 18b may search for an appropriate message delivery queue in which to save the message based on the intended destination of the message, for example. If no message delivery queue exists for messages bound for the intended destination of the current message (i.e., client 16d), manager component 18b may initiate creation of a message delivery queue for messages bound for the destination of the current message (i.e., client 16d).

At step 204, manager component 18b may determine whether there are any preceding messages in the message delivery queue to which the message was saved (e.g., the message delivery queue for the intended destination). For example, the message delivery queue may include messages, which manager component 18b previously but unsuccessfully attempted to send to the destination associated with the message delivery queue. These messages may be stored in the message delivery queue to be resent in the future. In one embodiment, if there are preceding messages in the message delivery queue to which the message was saved (e.g., the message delivery queue for the intended destination), manager component 18b does not attempt to send the current message to the intended destination (i.e., client 16d), presuming that because there are messages in the message delivery queue associated with that destination, that the destination is still offline or otherwise unavailable. In another embodiment, manager component 18b initiates an attempt to send the current message even though there are messages in the message delivery queue.

If manager component 18b determines at step 204 that there are one or more preceding messages in the message delivery queue, manager component 18b determines at step 206 whether the current message has expired. In one embodiment, a predetermined time is used to determine whether the message is expired, and manager component 18b determines whether the message has been in the message delivery queue for the predetermined time. The predetermined time for expiration may be one day or any other suitable time, according to particular needs. If manager component 18b determines at step 206 that the message has expired (e.g., that the message has been in the message delivery queue for the predetermined time), the message may be erased from memory 20b and the message delivery queue at step 208. In one embodiment, the message may expire before preceding messages in the message delivery queue if the message has a shorter predetermined time for expiration. If manager component 18b determines at step 206 that the messages has not expired, then manager component 18b may return to step 204 to determine whether there are any preceding messages in the message delivery queue. In one embodiment, decision steps 204 and 206 may cycle continuously or at any other suitable interval until either the message expires or there are no preceding messages in the message delivery queue.

Returning to step 204, if manager component 18b determines that there are no preceding messages in the message delivery queue, manager component 18b may attempt to send the message to the intended destination (i.e., client 16d) at step 210. In one embodiment, client 16d may notify manager component 18b when client 16d is ready to begin receiving messages, which may prompt the manager component 18b to attempt to send messages from a message delivery queue client 16d.

At step 212, manager component 18b determines whether the message was successfully sent to the intended destination (i.e., client 16d). For example, manager component 18b may determine whether destination client 16d received the message upon receipt of an acknowledgment from client 16d. If manager component 18b determines at step 212 that the message was not successfully sent to the intended destination (i.e., client 16d), then manager component 18b determines at step 214 whether the message has expired. If the message has expired at step 214, then manager component 18b may erase the message from memory 20b and the message delivery queue at step 208. If the message has not expired at step 214, then manager component 18b may return to step 210 to attempt to send the message to the intended destination (i.e., client 16d) again. In one embodiment, manager component 18b may cycle through steps 210, 212, and 214 continuously or at any other suitable interval until either the message expires or until the message is successfully sent to the intended destination. Returning to step 212, if manager component 18b determines that the message was successfully sent to the intended destination (i.e., client 16d), manager component 18b may erase the message from memory 20b and the message delivery queue at step 216.

While the steps of the example methods described with reference to FIGS. 2 and 3 are described in a particular order, the present disclosure contemplates the steps of the methods being performed in any suitable order according to particular needs. Furthermore, the present disclosure contemplates client 16 sending messages to intended destinations directly and the process described above running in parallel to this direct sending, possibly providing further assurances that a message will be delivered to its intended destination.

Thus, in one embodiment, a client 16a sends messages to a local manager component 18a, which, upon receipt, persistently stores the message and assumes responsibility for message delivery. Client 16a need take no further action regarding message delivery and need not follow up regarding message delivery. The local manager component 18a may directly deliver the message to the intended destination client 16 if local to client 16a (e.g., client 16b) or may deliver the message to a manager component 18b local to the destination client 16 if remote (e.g., client 16d). In one embodiment, if a remote destination client 16 is not associated with a manager component 18, manager component 18a may deliver the message directly to remote destination client 16. In either case, manager component 18a may send the message until it is received at the intended destination client 16 or manager component 18 associated with intended destination client 16, or the message expires. If the message is delivered to a remote manager component 18, the remote manager component 18 may persistently store the message, assume responsibility for the message, and local manager component 18a may delete the message from memory 20a.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:
1. A computer-implemented method for communicating messages in a computing environment, comprising:
    sending an indication that a client of a first computer system wants to send a message to an intended destination of a second computer system, wherein sending the indication includes calling a send function that is part of an API associated with a first manager component of the first computer system;
    storing the message in a memory that is local to the client;
    determining, by the send function, whether the first manager component of the first computer system is available to receive the message;
    when the first manager component is available to receive the message, arranging, by the first manager component, the message in a message queue among at least one additional message having the intended destination such that the message queue includes a plurality of messages to be sent to the intended destination, wherein the plurality of messages in the message queue are arranged in an order in which the plurality of messages in the message queue were stored in the memory;
    determining, by the first manager component, a second manager component associated with the intended destination using a reference that maps the intended destination to the associated second manager component;

attempting to send, by the first manager component, the plurality of messages of the message queue to the second manager component based upon the order of the message queue;

determining, by the first manager component, if a first message from the plurality of messages in the message queue is successfully sent to the second manager component, wherein the determination of whether the first message was successfully sent includes determining whether the second manager component sent a confirmation that the second manager component received the first message;

when the first message is not successfully sent to the second manager component, retaining the first message, by the first manager component, among the plurality of messages in the message queue and attempting to send the first message successfully before attempting to send a remainder of the plurality of messages in the order of the message queue; and when the first message is successfully sent to the second manager component, attempting to send, by the first manager component, the remainder of the plurality of messages in the message queue in the order of the message queue to the second manager component such that the plurality of messages in the first message queue are received at the second manager component in the order of the message queue.

2. The computer-implemented method of claim 1, wherein the client comprises one or more of:
   a software application on the first computer system;
   a service on the first computer system; or
   a daemon on the first computer system.

3. The computer-implemented method of claim 1, wherein when the first message is not successfully sent to the intended destination, the method further comprises attempting to resend the first message to the second manager component in response to a notification received from the second manager component that the second manager component is ready to receive messages.

4. The computer-implemented method of claim 1, wherein arranging the message in a message queue further comprises:
   determining whether the message queue for the intended destination exists; and
   when it is determined that the message queue for the intended destination does not exist:
     generating the message queue for the intended destination, and
     storing the message in the generated message queue.

5. The computer-implemented method of claim 1, further comprising:
   determining whether the first message has expired according to a predetermined time period; and
   when it is determined that the message has expired, removing the first message from the message queue as if the first message had been delivered.

6. The computer-implemented method of claim 1, further comprising erasing the first message from the message queue after it has been determined that the first message was successfully sent to the second manager component.

7. A message managing system for communicating messages in a computing environment, comprising:
   one or more processors configured to:
     call a send function to indicate that a client of a first computer system wants to send a message to an intended destination of a second computer system, wherein the send function is part of an API associated with a first manager component of the first computer system;
     store the message in a memory that is local to the client;
     determine, by the send function, whether the first manager component of the first computer system is available to receive the message;
     when the first manager component is available to receive the message, arrange, by the first manager component, the message in a message queue among at least one additional message having the intended destination such that the message queue includes a plurality of messages to be sent to the intended destination, wherein the plurality of messages in the message queue are arranged in an order in which the plurality of messages in the message queue were stored in the memory;
     determine, by the first manager component, a second manager component associated with the intended destination using a reference that maps the intended destination to the associated second manager component;
     attempt to send, by the first manager component, the plurality of messages of the messaging queue to the second manager component based upon the order of the message queue;
     determine, by the first manager component, if a first message from the plurality of messages in the message queue is successfully sent to the second manager component, wherein the determination of whether the first message was successfully sent includes a determination of whether the second manager component sent a confirmation that the second manager component received the first message;
     when the first message is not successfully sent to the second manager component, retain the first message, by the first manager component, among the plurality of messages in the message queue and attempt to send the message successfully before an attempt is made to send a remainder of the plurality of messages in the order of the message queue; and
     when the first message is successfully sent to the second manager component, attempt to send, by the first manager component, the remainder of the plurality of messages in the message queue in the order of the message queue to the second manager component such that the plurality of messages in the first message queue are received at the second manager component in the order of the message queue.

8. The message managing system of claim 7, wherein the client comprises one or more of:
   a software application on the first computer system;
   a service on the first computer system; or
   a daemon on the first computer system.

9. The message managing system of claim 7, wherein the intended destination comprises one or more of:
   a client running on a different computer system; or
   a manager component on a different computer system.

10. The message managing system of claim 7, wherein when the first message is not successfully sent to the intended destination, the one or more processors further configured to:
    attempt to resend the first message to the second manager component in response to a notification received from the second manager component that the second manager component is ready to receive messages.

11. The message managing system of claim 7, wherein the one or more processors are further configured to:

determine whether the message queue for the intended destination exists; and when it is determined that the message queue for the intended destination does not exist:
 generate the message queue for the intended destination, and
 store the message in the generated message queue.

12. The message managing system of claim 7, wherein the one or more processors are further configured to:
 determine whether the first message has expired according to a predetermined time period; and
 when it is determined that the message has expired, remove the first message from the message queue as if the first message had been delivered.

13. The message managing system of claim 7, wherein the one or more processors are further configured to erase the first message from the message queue after it has been determined that the first message was successfully sent to the second manager component.

14. A non-transitory computer readable medium storing computer executable instructions for communicating messages in a computing environment, the instructions when executed on one or more processors configuring the one or more processors to:
 call a send function to indicate that a client of a first computing system wants to send a message to an intended destination of a second computing system, wherein the send function is part of an API associated with a first manager component of the first computer system;
 store the message in a memory that is local to the client;
 determine, by the send function, whether the first manager component of the first computer system is available to receive the message;
 when the first manager component is available to receive the message, arrange, by the first manager component, the message in a message queue among at least one additional message having the intended destination such that the message queue includes a plurality of messages to be sent to the intended destination, wherein the plurality of messages in the message queue are arranged in an order in which the plurality of messages in the message queue were stored in the memory;
 determine, by the first manager component, a second manager component associated with the intended destination using a reference that maps the intended destination to the associated second manager component;
 attempt to send, by the first manager component, the plurality of messages in the message queue to the second manager component upon the order of the message queue;
 determine, by the first manager component, if a first message from the plurality of messages in the message queue is successfully sent to the second manager component, wherein the determination of whether the first message was successfully sent includes a determination of whether the second manager component sent a confirmation that the second manager component received the first message;
 when the first message is not successfully sent to the second manager component, retain the first message, by the first manager component, among the plurality of messages in the message queue and attempt to send the message successfully before an attempt is made to send a remainder of the plurality of messages in the order of the message queue; and
 when the first message is successfully sent to the second manager component, attempt to send the remainder of the plurality of messages in the message queue in the order of the message queue to the second manager component such that the plurality of messages of the message queue are received at the second manager component in the order of the message queue.

15. The non-transitory computer readable medium of claim 14, wherein:
 the first computer system comprises a single computer; and
 the client comprising an application on the first computer system.

16. The non-transitory computer readable medium of claim 14, wherein the client comprises one or more of:
 a software application on the first computer system;
 a service on the first computer system; or
 a daemon on the first computer system.

17. The non-transitory computer readable medium of claim 14, wherein the intended destination comprises one or more of:
 a client running on a different computer system; or
 a manager component on a different computer system.

18. The non-transitory computer readable medium of claim 14, wherein when the first message is not successfully sent to the intended destination, the instructions when executed further configuring one or more processors to:
 attempt to resend the first message to the second manager component in response to a notification received from the second manager component that the second manager component is ready to receive messages.

19. The non-transitory computer readable medium of claim 14, the instructions that configure one or more processors to arrange the message in a message queue further comprise configuring the one or more processors to:
 determine whether the message queue for the intended destination exists; and
 when it is determined that the message queue for the intended destination does not exist:
  generate the message queue for the intended destination, and
  store the message in the generated message queue.

20. The non-transitory computer readable medium of claim 19, the instructions when executed further configuring one or more processors to:
 erase the first message from the message queue after it has been determined that the first message was successfully sent to the second manager component.

21. The non-transitory computer readable medium of claim 14, the instructions when executed further configuring one or more processors to:
 determine whether the first message has expired according to a predetermined time period; and
 when it is determined that the message has expired, remove the first message from the message, queue as if the first message had been delivered.

22. A system for communicating messages in a computing environment, comprising:
 one or more processing devices configured to:
  call a send function to indicate that a client of a first computing system wants to send a message to an intended destination of a second computer system, wherein the send function is part of an API associated with a first manager component of the first computer system,
  store the message in a memory that is local to the first computer system,
  determine, by the send function, whether the first manager component of the first computer system is available to receive the message, when the first manager component is available to receive the message, arrange the message in a message queue among at least one additional message having the intended destination such that the message queue includes a plurality of messages to be sent to the intended destination, wherein the plurality of messages in the message queue are arranged in an order in which the plurality of messages in the message queue were stored in the memory;

determine, by the first manager component, a second manager component associated with the intended destination using a reference that maps the intended destination to the associated second manager component;

attempt to send the plurality of messages in the message queue to the second manager component based upon the order of the message queue;

determine if a first message from the plurality of messages in the message queue is successfully sent to the second manager component wherein the determination of whether the first message was successfully sent includes a determination of whether the second manager component sent a confirmation that the second manager component received the first message; and when the first message is not successfully sent to the second manager component, retain the first message among the plurality of messages in the message queue and attempt to send the message successfully before an attempt is made to send a remainder of the plurality of messages in the order of the message queue; and when the first message is successfully sent to the second manager component, attempt to send the remainder of the plurality of messages in the message queue in the order of the message queue to the second manager component such that the messages of the message queue are received at the second manager component in the order of the message queue.

23. The system of claim 22, wherein the intended destination comprises one or more of:
a client running on a different computer system; or
a manager component on a different computer system.

24. The system of claim 22, wherein when the first message is not successfully sent to the intended destination the one or more processors are further configured to:
attempt to resend the first message to the second manager component in response to a notification received from the second manager component that the second manager component is ready to receive messages.

25. The system of claim 22, wherein the one or more processors configured to arrange the message in a message queue further comprise one or more processors configured to:
determine whether the message queue for the intended destination exists; and
when it is determined that the message queue for the intended destination does not exist:
generate the message queue for the intended destination, and
store the message in the generated message queue.

* * * * *